United States Patent [19]
Usami et al.

[11] Patent Number: 5,088,432
[45] Date of Patent: Feb. 18, 1992

[54] ANTI-FOULING SYSTEM FOR SUBSTANCES IN CONTACT WITH SEAWATER

[75] Inventors: Masahiro Usami; Kenji Ueda; Kiyomi Tomoshige; Shozo Ohta; Tsutomu Horiguchi; Hiroshi Yamazaki, all of Nagasaki, Japan

[73] Assignee: Mitsubishi Jukogyo Kabushiki Kaisha, Tokyo, Japan

[21] Appl. No.: 436,047

[22] Filed: Nov. 14, 1989

[30] Foreign Application Priority Data

Nov. 14, 1988 [JP] Japan .................. 63-287190
Jun. 1, 1989 [JP] Japan ................... 1-139973

[51] Int. Cl.$^5$ ............................... C23F 13/00
[52] U.S. Cl. .................. 114/67 R; 114/222; 204/148
[58] Field of Search ......... 114/67 R, 222; 204/147, 204/148

[56] References Cited

U.S. PATENT DOCUMENTS

| | | | |
|---|---|---|---|
| 3,510,094 | 5/1970 | Clark | 114/67 R |
| 3,625,852 | 12/1971 | Anderson | 114/222 |
| 3,984,302 | 10/1976 | Freedman et al. | 204/147 |
| 4,127,687 | 11/1978 | Dupont | 428/34.1 |

FOREIGN PATENT DOCUMENTS

2391904 12/1978 France .
63-101464 5/1988 Japan .
63-103789 5/1988 Japan .

Primary Examiner—Sherman Basinger
Assistant Examiner—Thomas J. Brahan
Attorney, Agent, or Firm—Fleit, Jacobson, Cohn, Price, Holman & Stern

[57] ABSTRACT

The current invention relates to an anti-fouling system for substances in contact with seawater which is constituted of the first conductive membrane that is coated on the outer side of the electric insulator mounted at the surface of the substance such as ships, marine structures in contact with seawater and is composed of thin sheets of metals having low specific resistance or metal oxide, spray-coated membrane, evaporated membrane or fused membrane, and the second conductive anti-fouling membrane having higher electric resistance than the first conductive membrane which is coated on the outer side of the above first conductive membrane and which is composed of the oxidation-resistant insoluble substance and the organic binder, and the power supply equipment that supplies direct currents flowing from the first conductive membrane through the second conductive membrane toward the electric conductor made of iron, copper or carbon located in seawater and opposite the second conductive membrane, owing to the constitution of which the prevention of rise in resistance because of consumption of the conductive membrane, the uniforming of current distribution and a high anti-fouling performance by using the low-resistant conductive membrane are achieved.

9 Claims, 4 Drawing Sheets

ANTI-FOULING SYSTEM FOR SUBSTANCES IN CONTACT WITH SEAWATER

BACKGROUND OF THE INVENTION

The present invention relates to an anti-fouling system for substances in contact with seawater such as ships, offshore structures, undersea structures, bridge beams, rearing crawls, quaywalls, canals, gates, power plants, water intake-drainage pipes, water intake-drainage ducts, etc.

In order to prevent fouling on substances such as ships, offshore structures and the like being in contact with seawater, a method to coat the areas contacting seawater with anti-fouling paint has been generally used.

There are, however, the following drawbacks in this method:

(1) The conventional method can comply with changes in seasons, ocean currents, and water quality with flexibility due to its inability to control the elution speed of anti-fouling ingredients.

(2) As the poison content in the anti-fouling paint is not permitted to exceed a limit, the anti-fouling paint must be recoated every two years.

The applicant has developed equipment to generate effective ingredients to prevent adhesion of marine organisms wherein insulating paints 3 (see FIG. 1) such as epoxy resin and conductive paints 5 in which carbon powder is mixed with organic binder are coated on a structure 1 in contact with seawater 2, and direct current is supplied from a power source box 7 between the conductive paints 5 and an electric conductor 6 composed of steel and the like with the conductive paints 5 as an anode and the electric conductor 6 as a cathode wherein the effective ingredients are generated on the conductive paints 5, which is shown in FIG. 10 and disclosed in Japanese Patent Provisional Publication No. 63-101464 (No. 101464 1988) and No. 63-103789 (No. 103789 1988).

However, it has become clear that this method has the following disadvantages:

(1) Though the electric current density in seawater 2 must be maintained at more than a fixed value, due to a rise in resistance caused by consumption in the conductive paints 5, electric current density tends to be concentrated near a connecting terminal which makes the effective anti-fouling range narrow.

(2) Due to a difference in electric current density caused by irregularity of thickness of the conductive paint 5, it is hard to maintain an expected performance.

(3) Conductive paints of low resistance are required for uniformity of electric current density. To produce paints having such properties, a large quantity of conductive powder must be mixed in which makes the production troublesome.

(4) Because the effective anti-fouling range, a reaching distance of electric current density required for prevention of fouling, is narrow or short, the system is difficult to apply to large-size structures.

BRIEF SUMMARY OF THE INVENTION

It is therefore one of the objects of this invention to provide an anti-fouling system for a substance in contact with seawater wherein a rise in resistance caused by consumption of the conductive paint is prevented and the problem of non-uniformity of electric current distribution due to irregularity of thickness of the conductive paint is solved and a high performance of prevention of fouling due to low-resistant conductive paints is achieved.

It is another object of the invention to provide an anti-fouling system for a substance in contact with seawater in which the capacity of a direct current power source is reduced without having the electric conductor (e.g. a cathode) equipped separately and by which large-size structures can be protected at a lower cost.

It is a further object of this invention is to provide the anti-fouling system for a substance in contact with seawater wherein the application cost for the conductive paint is reduced and the debonding of the conductive paint is prevented as well.

To achieve the above-mentioned objects, this invention is constituted of the following:

(1) The system is constituted of a first conductive membrane which is coated on the outer side of the electric insulator on the surface of the substance such as ships and marine structures contacting seawater, and is composed of a thin sheet of metal having low specific resistance or metal oxide, a spray-coated membrane, and an evaporated membrane such as Physical Vapor Deposit membrane (PVD membrane) and Chemical Vapor Deposit membrane (CVD membrane), or fused membrane; a second conductive anti-fouling membrane having a higher electric resistance than the first conductive membrane which is coated on the outer side of the first conductive membrane and which is composed of an oxidation-resistant insoluble substance and an organic binder; and a power source (power supply equipment) connected between the first conductive membrane and an electric conductor, which supplies direct current flowing from the first conductive membrane through the second conductive membrane toward the electric conductor made of iron, copper or carbon located in the seawater and juxtaposed with respect to the second conductive membrane. The functions and effects obtained by this invention include, in the anti-fouling system using a conductive membrane, the prevention of rise in resistance due to consumption of the conductive membrane and the solution of the problem of non-uniformity of electric current distribution due to irregularity of thickness of the conductive membrane, and a high anti-fouling performance by using the low-resistant conductive membrane as well.

(2) The system is constituted of the first conductive membrane which is coated on the outer side of the electric insulator on the surface of the substance such as ships and marine structures in contact with seawater, and is composed of a thin sheet of metals having low specific resistance, or a metal oxide, spray-coated membrane, evaporated membrane and fused membrane, and is divided into multiple parts, preferably in the form of strips; the second conductive anti-fouling membrane having higher electric resistance than the first conductive membrane and which is coated on the outer side of the first conductive membrane and is composed of an oxidation-resistant insoluble substance and an organic binder, which is also divided into multiple parts, preferably in the form of strips; and a direct current power source having a polarity reversing switching circuit that supplies electric current in seawater alternatively flowing from the anode which is arbitrarily connected at an end of a divided part of the first conductive membrane to the cathode which is also arbitrarily connected at a end of another divided part of the first conductive membrane.

The functions and effects in this invention are that by this construction, the electric current in seawater can be supplied, as an anode, to one of the multiple strip conductive membranes and as a cathode to another of the divided membranes and, moreover, both or either of the anode and the cathode can be switched to other strip conductive membranes timely and suitably without having a new cathode conductor equipped separately, resulting in a reduction of electric current and in a increase of the effective anti-fouling length.

(3) In the above (1) and (2), the first conductive membrane has a characteristic in that it is formed in a strip or lattice shape. The effects in this invention lies in that by this construction, the application cost of the first conductive membrane is reduced and the debonding of the membrane can be prevented.

For this reason, the current invention is very useful for industries.

BRIEF DESCRIPTION OF THE DRAWINGS

The invention will now be described in detail with reference to the accompanying drawings, wherein.

DETAILED DESCRIPTION OF PREFERRED EMBODIMENTS

The examples of embodiments of the anti-fouling system for substances in contact with seawater of this invention will now be described.

EXAMPLE 1

Figure 1:
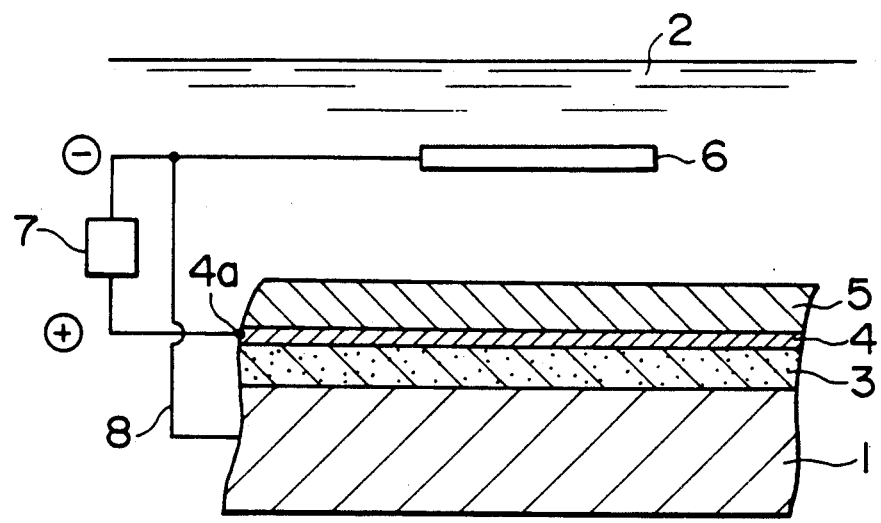
FIG. 1 is a schematic illustration of the first embodiment of the anti-fouling system for substances in contact with seawater of the present invention.
Figure 2:
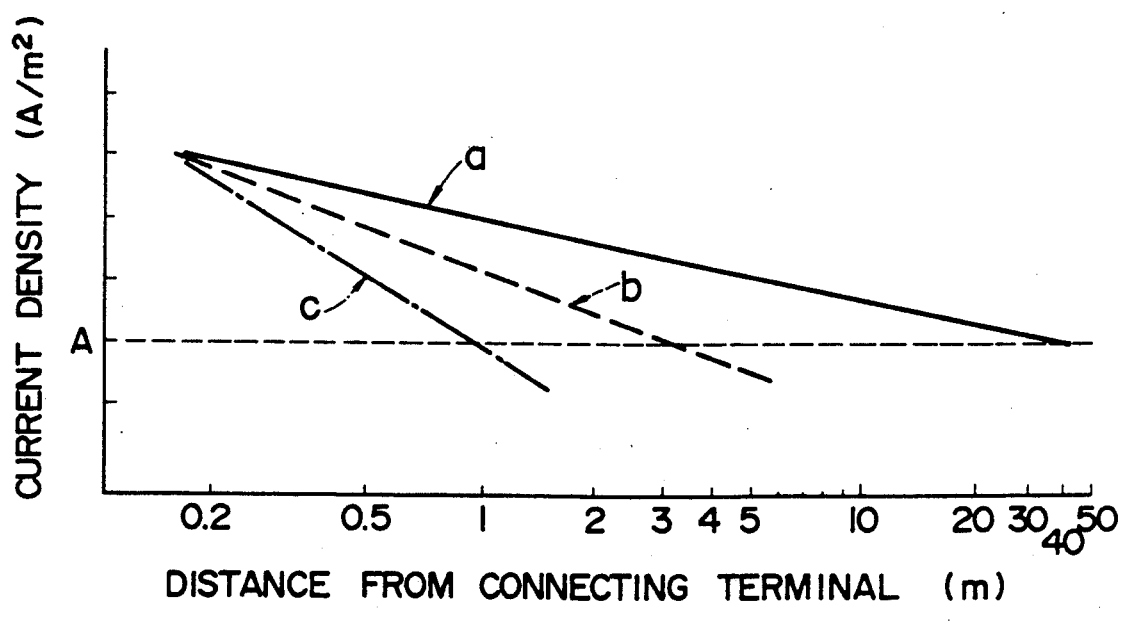
FIG. 2 is a graph showing the conductive effective distance in the above system in comparison with conventional equipment.

FIG. 1 is an illustration of the example and FIG. 2 is a diagram of the conductive effective distance of the conductive membrane in comparison with the conventional system.

In FIG. 1, the number 1 shows a steel plate constituting an outer plate of the structure in contact with seawater, 3 showing an insulating membrane composed of epoxy resin which is coated on the outer side of the steel plate 1, and 4 showing the first conductive membrane composed of the thin plate of metals having low specific resistance or a metal oxide, spray-coated membrane, fused membrane, or evaporated membrane which is coated on the outer side of the insulating membrane 3, and on one end of which a connecting terminal 4a is mounted.

As metals having low specific resistance, nickel, copper, titanium, aluminum, niobium and the like can be used. As a metal oxide, magnetite, manganese dioxide and the like can be used.

5 is the second conductive membrane composed of an oxidation-resistant insoluble substance and organic binder which is coated on the outer side of the first conductive membrane 4. As oxidation-resistant insoluble substances, graphite, carbon black, magnetite, platinum and the like can be used. As the organic binders, epoxy resin, vinyl resin, unsaturated polyester resin and the like can be used. This second conductive membrane 5 has higher electric resistance than the first conductive membrane 4.

6 is a cathode electrode composed of iron, copper or carbon which is positioned in seawater 2 opposite, or juxtaposed, the second conductive membrane 5. Electric power supply equipment 7 is connected between the connecting terminal 4a of the first conductive membrane 4 and the cathode electrode 6, and supplies direct current from the first conductive membrane 4 through the second conductive membrane 5 toward the cathode electrode 6. 8 is a lead line to connect the steel plate 1 with the cathode electrode 6.

In this system, when the direct current is supplied from the first conductive membrane 4 through the second conductive membrane 5 toward the cathode electrode 6 in seawater, the surface of the second conductive membrane 5 is covered with a membrane containing the effective ingredients having a preventive effect on adhesion of marine organism.

In this system, the direct current is supplied from the connecting terminal 4a connected to the first conductive membrane 4 through the first conductive membrane 4 having low electric resistance in the direction of the thickness of the second membrane 5. Therefore, there is no concentration of electric current density near to the connecting terminal 4a even with the exhaustion of the second conductive membrane 5. For this reason, stable and uniform distribution of electric current density is maintained for a long period resulting in a high performance of anti-fouling with less power consumption.

With the lead line 8, the steel plate 1 is connected so as to be in the (−) electric potential and both the first conductive membrane 4 and the second conductive membrane 5 are connected so as to be in the (+) electric potential, and therefore, when the exposed surface appears on the steel plate 1 due to local damage on the first conductive membrane 4 and the second conductive membrane 5, a part of the direct current flowing out from the conductive membranes 4 and flows into the exposed surface of the steel plate 1, from which the current is returned to the cathode of the direct current power supply equipment 7 by which the corrosion of the steel plate 1 is prevented.

In consideration of the case where the second conductive membrane 5 is damaged and part of the surface of the first conductive membrane 4 is exposed, in order to prevent chemical elution, the adoption of titanium, niobium, metal oxide and the like as the materials for the first conductive membrane 4 is effective for long and stable operation of this system.

Further, in this system, the electric resistance $R_4$ in parallel with the steel plate 1 of the first conductive membrane is lower than the resistance $R_5$ in parallel with the second conductive membrane 5, and therefore, in order to achieve uniformity of electric current density distribution by supplying about 95% of the current flowing from the connecting terminal 4a through the first conductive membrane 4, $(R_4/R_5) \leq 0.1$ is preferable. Moreover, when the thickness of the first conductive membrane 4 and the second conductive membrane 5 is decided, the volume resistivity as well as damage due to the current supply through the conductive membrane 5 and external circumstances must be taken into consideration.

Especially, to apply this invention to large-scaled structures, the resistance of the first conductive membrane must be lower than that of the metal conductive membrane composed of metals having low specific resistance or metal oxide and the organic binder. For this reason, although there is a metal-thin-plate attaching method for the above purpose, spray-coating is the most effective membrane-forming method when easiness of fabrication and practicality are considered.

FIG. 2 shows test results where the effective conductive distance from the connecting terminal of the conductive membrane in this invention is compared with that in the conventional equipment. The conditions of each conductive membrane is described below.

Equipment in this invention:

| Equipment in this invention: | |
| --- | --- |
| First conductive membrane: | resistance $1.6 \times 10^{-3}$ Ω-m, thickness of membrane 20 μm |
| Second conductive membrane: | resistance 30 Ω-m, thickness of membrane 200 μm |
| Conventional equipment: | |
| Conductive membrane: | resistance 3 Ω-m, thickness of membrane 200 μm |

Thus, when 80 mA of current are supplied from the connecting terminal to such conductive membrane, although the effective length, in the conventional equipment (b), to maintain required electric current density A is 3 m, it is 45m in this equipment of the current invention. When the thickness of the second conductive membrane in the system of the current invention is changed from 200 μm to 100 μm, no change in the effective length is found. However, it is reduced to 1 m in the conventional system as the (c) line shows.

EXAMPLE 2

The example shows an improvement in which the application cost is reduced more than in EXAMPLE 1, the conductive membrane is coated by a spray-coating method, and the debonding of spray-coated membranes due to residual stress is prevented.

Figure 3:
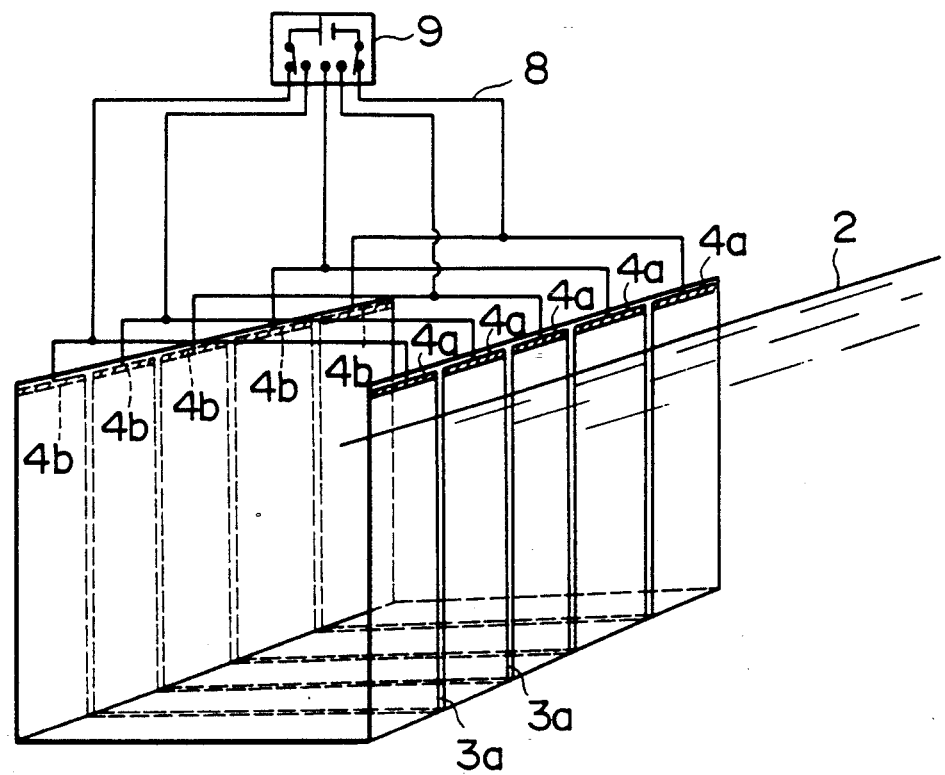
FIG. 3 is a schematic illustration of the second embodiment of this invention in a general perspective view illustrating application of conductive membranes to a structure.
Figure 4:
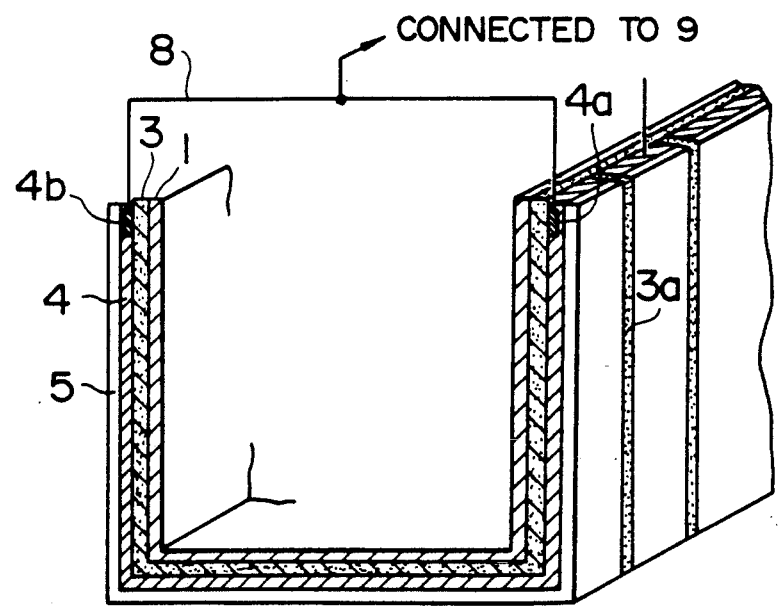
FIG. 4 is a local enlarged view of part of FIG. 3.

FIG. 3 is a general perspective view. FIG. 4 is a local enlarged view of part of FIG. 3. In these figures, the numbering of the same parts is the same as in FIG. 1. 3 is an insulating membrane and 3a is an insulating membrane which partitions the strip conductive membrane 4 into multiple parts to be descried later. 4 is the first conductive membrane, as shown in EXAMPLE 1, composed of metals having low specific resistance, a thin plate of metal oxide, spray-coated membrane, fused membrane or evaporated membrane, which is coated on the outer side of the insulating membrane 3. The first conductive membrane 4 is formed on the insulating membrane 3 in multiple longitudinal strips in parallel with each other at short intervals and the adjoining strip conductive membrane 4 is partitioned by the insulating membranes 3a. 4a and 4b are connecting terminals respectively mounted on both ends of strip conductive membrane 4.

5 is the second conductive membrane coating the outer side of each strip conductive membrane 4, which is composed of an oxidation-resistant insoluble substance and an organic binder. As the oxidation-resistant insoluble substance, graphite, carbon black, magnetite and platinum can be used and, as the organic binder, various resins as described above can be used. Moreover, the electric resistance of the second conductive membrane 5 is higher than that of the first conductive membrane 4.

Further, 9 is direct current power supply equipment having a function (e.g. polarity reversing switch) of switching the anode and the cathode at a fixed interval for two strip conductive membranes 4, 4. Thus, the direct currents are supplied to each part of proportioned conductive membranes 4, 4 as the anode and the cathode alternatively. Here, the direct currents, as shown in FIG. 3, flow from connecting terminals 4a, 4b connected to one division used as the anode, of the strip divided conductive membrane 4 to connecting terminals 4a, 4b connected to another division used as the cathode, of the divided conductive membrane 4. In this mechanism, the electrolytic reaction progresses on the surface of the strip conductive membrane 4 used as the anode to produce the effective ingredient (hypochlorous acid) on the surface of the membrane for prevention of adhesion of marine organism. By reversing the strip conductive membrane 4 for the anode or cathode in a fixed cycle, the anti-fouling effect is achieved on the whole surface of the membrane, and by proportioning the membrane into multiple strips and combining the anode and cathode, a more economical anti-fouling system is realized.

By adopting this construction, the additional cathode electrode 6 is not required to be installed opposite the structure and further the currents can be reduced by divisioning of the membrane to which the current is supplied resulting in reduction of capacity of the direct current power supply equipment and of the required costs.

EXAMPLE 3

Figure 5:
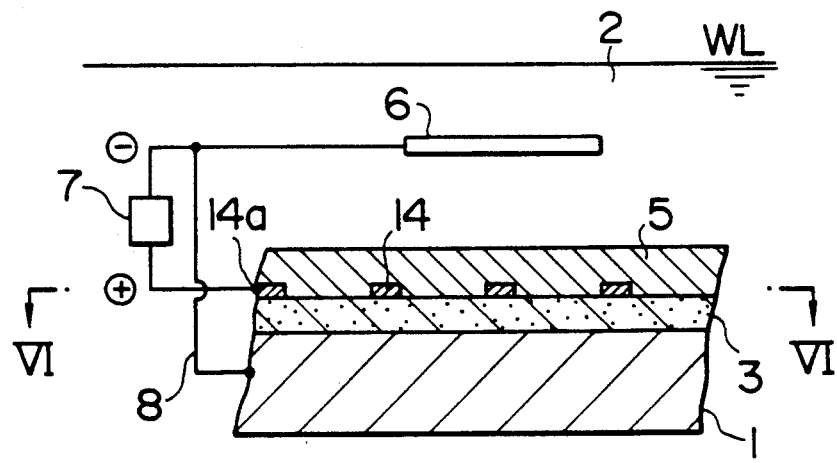
FIG. 5 is a view similar to FIG. 1 of the third embodiment showing application of this invention to steel structures.
Figure 6:
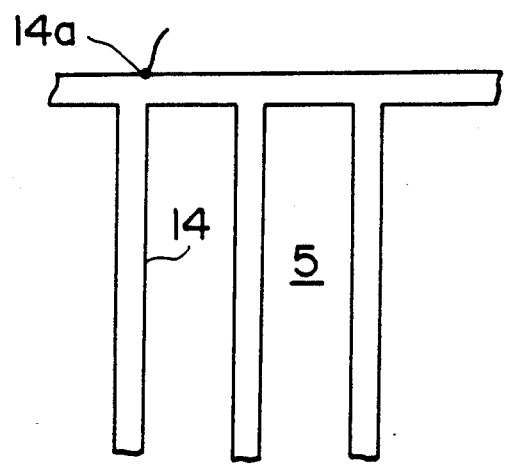
FIG. 6 is a cross-sectional view taken along line VI—VI of FIG. 5.

FIG. 5 to FIG. 9 illustrate the examples in which this invention is applied to steel structures and the same numbers as in FIGS. 1 and 2 represent the same parts or materials as in these figures. In the illustration of FIG. 5 and the cross-sectional view of FIG. 6, 14 is the first conductive membrane coated on the insulating membrane 3 in multiple and parallel strips, on one end of which the connecting terminal 14a is connected and the material of which is the same as the first conductive membrane 4 described above and, in this example, a spray-coated metal thin plate composed of metal oxide is used in consideration of workability. 5 is the second conductive membrane coating the outer side of the first conductive membrane 14, the material of which is the as the second conductive membrane 4 of the FIG. 1 embodiment.

In this system, because the first conductive membrane 14 is equipped in multiple and parallel strips, the quantity of materials of the membrane can be saved to several tens percent of the first conductive membrane 4 in the previous example where the membrane is coated generally without being proportioned. Moreover, the first conductive membrane 14 is in strip shape with narrow width and, therefore, residual stress at edges on both sides of each strip is reduced. Further, because the second conductive membrane 5 is conductive itself, even if the first conductive membrane 14 is not formed generally, the current can be supplied to the second conductive membrane 5 generally.

Figure 7:
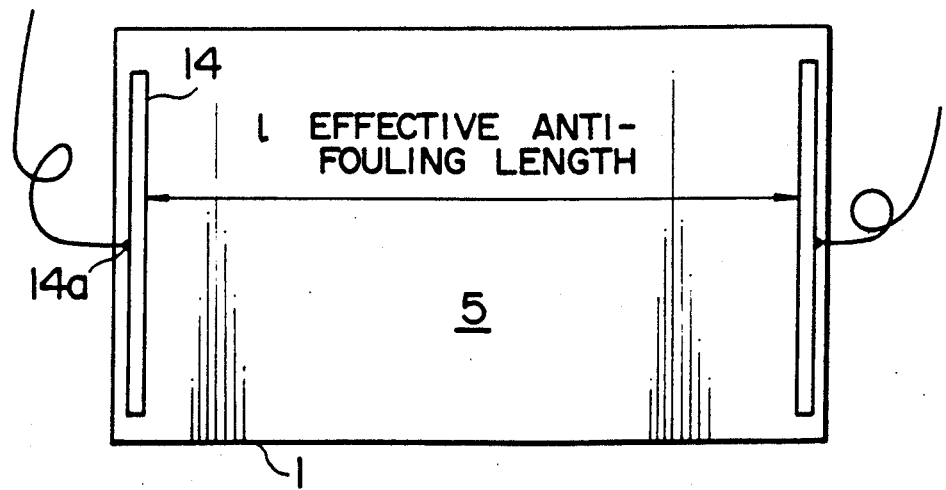
FIG. 7 is a plan view showing the basic test instructions in sea shown in FIG. 5.

A pair of the first conductive membranes 14 in the right and the left to which the current is supplied through the connecting terminal 14a equipped on the steel plate 1, which was coated with the second conductive membrane 5, is hung on from a raft on the sea for a testing to confirm the effectiveness as shown in the front view of FIG. 7. The result shows that the effective anti-fouling length was 1 m wherein the direct current of current density of 1 A/m$^2$ and less was supplied from the first conductive membrane 14 spray-coated with aluminum to the second conductive membrane 5 of thickness of 300 $\mu$m which is composed of a mixture of vinyl resin paint with graphite powder in particle diameter of 45 $\mu$m and less with a mixing rate of 100:40 in volume concentration.

Figure 8:
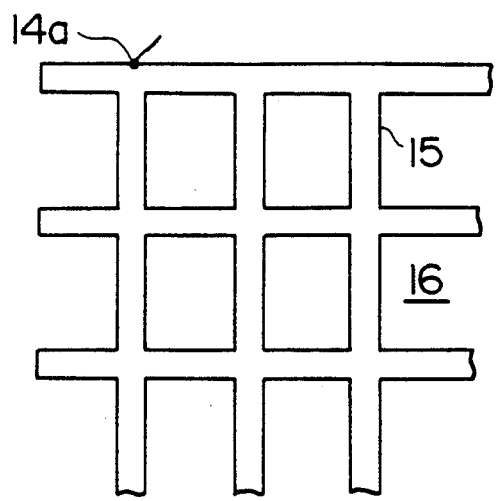
FIG. 8 is a view similar to FIG. 6 showing a modification thereof.

The cross-sectional view of FIG. 8 is a modification of the embodiment of FIG. 6 in which 15 is the first conductive membrane coated on the insulating membrane 3 in a lattice form vertically and horizontally at suitable intervals, on one end of which the connecting terminal 14a is connected; 16 is the second conductive membrane coating on the outer side of the first conductive membrane 15. Thus, the same effects are practically performed in this modification as in EXAMPLE 3. If a part of the first conductive membrane 15 should be cut away by external force, a bypass is automatically formed to let the current by supplied to the downstream side of the circuit.

Figure 9:
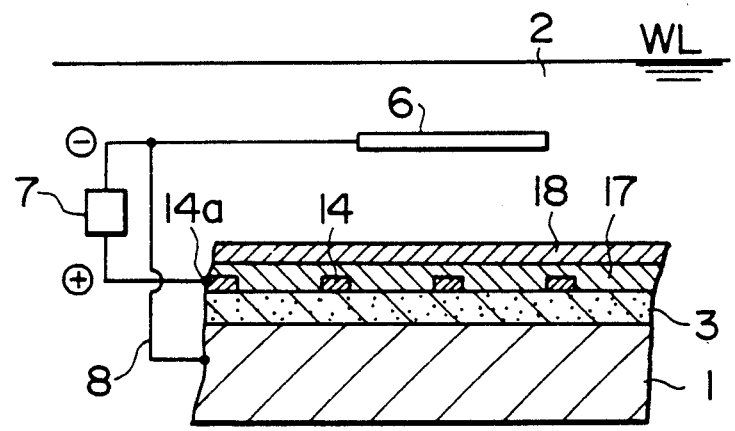
FIG. 9 is a view similar to FIG. 5 showing a modification thereof.
Figure 10:
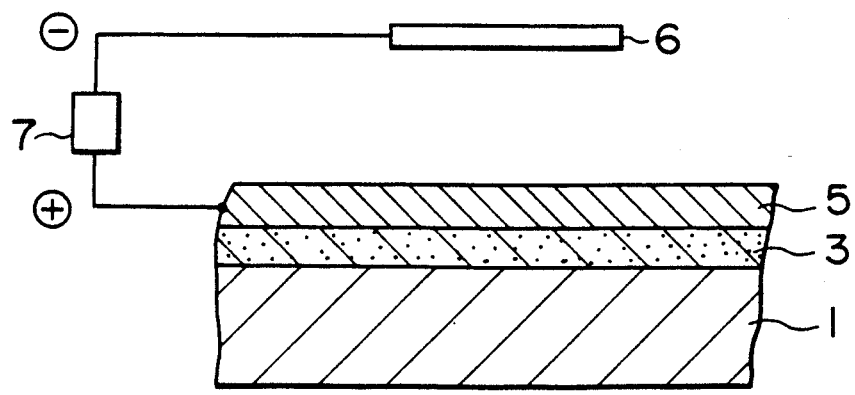
FIG. 10 is an illustration similar to FIG. 1 showing a conventional anti-fouling system.

FIG. 9 shows a modification of FIG. 5 in which 17 is the lower layer of the second conductive membrane composed of the paint wherein the quantity of the conductive paint made of metal, graphite and oxidation-resistant insoluble substance is increased to reduce the resistance of the second conductive membrane, which is coated directly on the first conductive membrane 14. 18 is the outer layer of the second conductive membrane composed of the paint wherein the quantity of the paint is reduced to increase the airtightness of the membrane, which is coated, to improve the electrolyzation-resistance of the second conductive membrane on the lower layer 17 thereof. Thus, in the modification, the same effects can be practically performed as in the example of FIG. 5 and the resistance of the second conductive membrane is decreased and the intervals in parallel of the first conductive membrane 14 is increased.

In this connection, the basic test in seawater was performed in the same way as in FIG. 7 wherein the lower layer 17 of thickness of 200 $\mu$m of the second conductive membrane, composed of the mixture of acrylic resin with graphite powder in particle diameter of 45 $\mu$m and less, as the conductive paint, with a mixing rate of 100:60 in volume concentration, was coated with the outer layer 18 of thickness of 200 $\mu$m composed of a mixture of vinyl resin with graphite powder in particle diameter of 45 $\mu$m and less with a mixing rate of 100:40 in volume concentration. The result showed that the effective anti-fouling length 1 was 5 m.

In the above experiment, when the lower layer 17 of the second conductive membrane was composed of the mixture of the acrylic resin with copper powder with a mixing rate of 100:30 in volume concentration and with a thickness of 200 $\mu$m, the effective anti-fouling length 1 was 15 m.

As explained in these examples and modifications, the following effects are achieved by this invention:

(1) By having the first conductive membrane shaped in multiple parallel strips, or lattice form, the application area of the first conductive membrane can be reduced to several tens percent compared with that of the general application of the membrane and accordingly the cost for the system is reduced as well.

(2) By having the first conductive membrane shaped in multiple parallel strips, or lattice form, the width dimension of the first membrane can be made short and the residual stress is not generated at edges on both sides and therefore, there is no fear of debonding of the first conductive membrane.

We claim:

1. An anti-fouling system for a substance having an outer surface in contact with seawater comprising:
   an electric insulator coating on said outer surface of the substance and having an outer surface;
   a first conductive membrane coating on said outer surface of said electric insulator coating, said fist conductive membrane coating having an outer surface and comprising a thin sheet of material selected from the group consisting of metals having low electrical resistance, titanium, niobium, metal oxide, spray-coated membrane, evaporated membrane, and fused membrane;
   a second conductive anti-fouling membrane coating having higher electrical resistance than said first conductive membrane coating on said outer surface of said first conductive membrane coating and comprising an oxidation-resistant insoluble material and an organic binder;
   an electric conductor made of a material selected from the group consisting of steel, iron, copper and carbon and mixtures thereof positioned in the seawater in opposed spaced relation to said second conductive membrane coating; and
   a power source connected between said first conductive membrane coating and said electric conductor for supplying direct current flowing from said first conductive membrane coating through said second conductive membrane coating toward said electric conductor.

2. The anti-fouling system as claimed in claim 1 wherein:
   said first conductive membrane coating comprises a plurality of spaced strips.

3. The anti-fouling system as claimed in claim 2 wherein:
   said second conductive membrane coating comprises a plurality of spaced strips.

4. The anti-fouling system as claimed in claim 3 wherein:
   said strips of said first conductive membrane coating have end portions; and
   said power source further comprises a polarity switching circuit for alternating current flow from an anode at one of said end portions of each strip to a cathode at the other of said end portions of each strip.

5. The anti-fouling system as claimed in claim 2 wherein:
   said plurality of strips lie substantially in the same plane; and
   electrical insulation is provided between said strips.

6. The anti-fouling system as claimed in claim 5 wherein:
said plurality of second conductive membrane coating strips lie substantially in the same plane; and
electrical insulation is provided between said strips.

7. The anti-fouling system as claimed in claim 2 wherein:
said strips of said first conductive membrane coating have end portions; and
said power source further comprises a polarity switching circuit for alternating current flow from an anode at one of said end portions of each strip to a cathode at the other of said end portions of each strip.

8. The anti-fouling system as claimed in claim 1 wherein:
said first conductive membrane coating comprises a plurality of strips.

9. The anti-fouling system as claimed in claim 8 wherein:
said plurality of strips comprises a lattice form.

* * * * *